UNITED STATES PATENT OFFICE.

ALVIN L. JOHNSON AND ALFRED O. ALSTEN, OF WORCESTER, MASSACHUSETTS, ASSIGNORS OF ONE-FOURTH TO HORATIO C. GOULDING AND ONE-FOURTH TO JOHN A. ALSTEN, BOTH OF WORCESTER, MASSACHUSETTS.

PNEUMATIC CORE FOR REPAIRING TIRES.

1,148,171.   Specification of Letters Patent.   Patented July 27, 1915.

Application filed April 6, 1914.   Serial No. 829,801.

*To all whom it may concern:*

Be it known that we, ALVIN L. JOHNSON and ALFRED O. ALSTEN, respectively a citizen of the United States and a subject of the King of Sweden, both residing at Worcester, in the county of Worcester and State of Massachusetts, have invented a new and useful Pneumatic Core for Repairing Tires, of which the following is a specification.

This invention relates to the art of repairing tires of all kinds.

It is well known that in order to do a good repair job on an outer casing it is necessary to keep the material under a high degree of compression during the vulcanization. The greater the compression ordinarily the better the results, and the greater the durability of the repair job with a minimum number of parts.

This invention is designed to secure such compression even after the article has been used for a great length of time; also to provide a construction in which the part that is likely to give way in practice can be removed from the rest of the device and repaired or replaced without destroying the outside shell and especially to provide a construction which need not be made to fit the outer casing exactly but can be used to advantage even if not exactly the right size.

Other objects and advantages of the invention will appear hereinafter.

Reference is to be had to the accompanying drawings in which—

Figure 1:
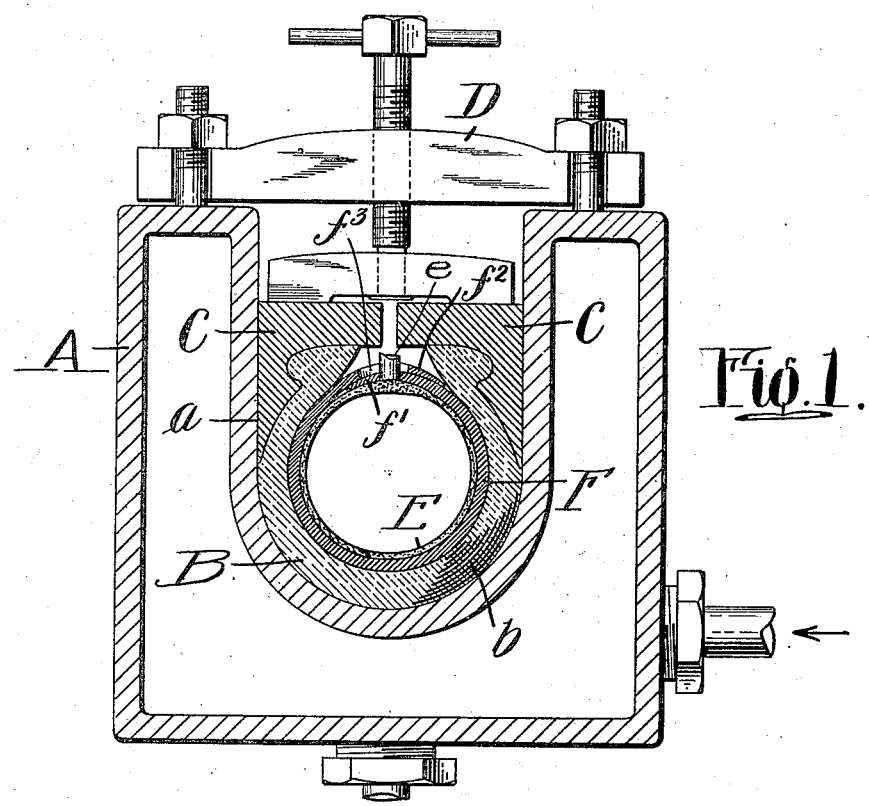
Figure 2:
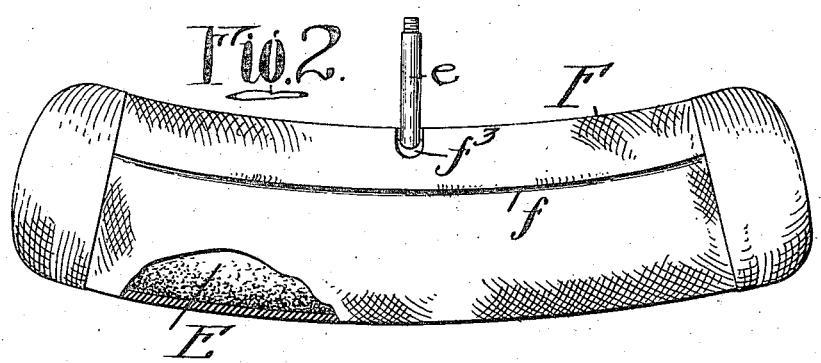
Figure 3:
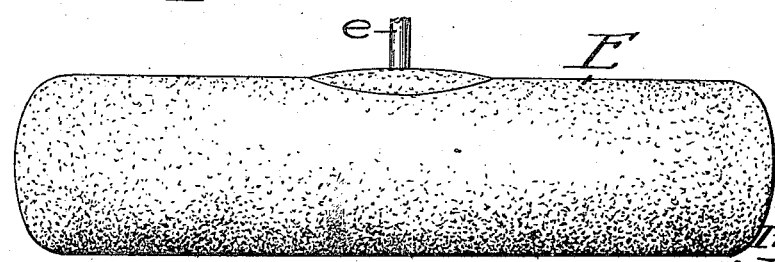

Figure 1 is a transverse vertical sectional view of a vulcanizing mold showing a preferred embodiment of this invention applied thereto; Fig. 2 is an elevation of the core as a whole; and Fig. 3 is an elevation of the inner tube thereof.

This invention is intended to be used with an ordinary type of vulcanizing mold A having a mold cavity $a$ for the reception of the outer casing B of the tire to be vulcanized. Plates C are used as usual for holding the outer casing in position and clamp D of ordinary form is shown holding these in position. The tire casing B is shown as provided with a patch $b$ which is made up of new material to be vulcanized to the tire in this mold.

For the purpose of holding the patch and the rubber around it under compression and keeping the outside surfaces firmly in contact with the walls of the cavity $a$, an expansible pneumatic core is provided consisting of two pieces, an inner tube E and an outer bag F. The inner tube is made of good live rubber so as to be expansible and is provided with a valve stem $e$ extending from it through which it can be inflated. The bag is formed of frictioned duck, canvas, or other similar flexible but non-expansible material which will stand the high heat employed in the vulcanizing process and protect the inner tube therefrom to some degree. It is also strong enough to hold the inner tube under all ordinary circumstances and keep approximately its shape. It is made up with rounded ends and with a slit $f$ preferably arranged longitudinally. This slit is formed by two flaps $f'$ and $f^2$ constituting the overlapping ends of the slit of this outer bag. Through the inner flap is a perforation for receiving the valve stem $e$ and registering with it, in the outer flap, is a perforation $f^3$ through which the stem also passes. One of these perforations, preferably the outer one $f^3$, is elongated circumferentially to permit of the extension of the outer bag F. This slit at $f$ is long enough to permit the inner tube to be inserted and withdrawn through it.

In the use of the device the puncture or blow-out is treated in the usual way so that a patch $b$ is provided. The core is then inserted in the outer casing B and the whole inserted in the mold A and fixed in position by the clamps. The inner tube E is inflated by connecting the valve stem with a supply of compressed air and as this expands it causes the edges of the bag F to spread so as entirely to fill the outer casing B. Heat is then applied in the usual way and the vulcanizing process of course is the usual one. The distention of the outer bag F is an important point because it permits the use of the device even when it does not perfectly fit the tire casing and yet the bag F securely holds the inner tube E in position and simply serves to protect it and to permit the transmission of the pressure from it to the tire casing and to the patch. It is to be noted that the two flaps $f'$ and $f^2$ overlap each other for a material distance so that the inner tube E is held in securely and there is practically no danger of a blowout. This advantage is further assumed by connecting each entire end of each of these flaps integrally with the other flap, so that the inner one cannot possibly come out through the longitudinal opening. In this way, it will be clear that no practical degree of pressure within will cause the outer bag to open enough to allow any part of the inner tube to protrude.

It will be seen that when the inner tube E requires repairs it can be taken out and repaired very readily without interfering with the bag F so that the latter will last for a great length of time. Ordinarily it outlasts several of the inner tubes. The great advantage of it is the adaptability of it to different sized tire casings and its adjustability permits it to be used when considerably out of shape and after it has been stretched in practice. The canvas is relieved of all strain and cannot blow out as the inner tube will expand to the limits of the mold but cannot possibly expand lengthwise beyond the length of the outer bag.

Although we have illustrated and described a single embodiment of the invention, we are aware of the fact that many modifications can be made therein by persons skilled in the art without departing from the scope of the invention as expressed in the claims. Therefore we do not wish to be limited to all the details of construction herein shown and described, but What we do claim is:

1. In a device of the class set forth, an outer bag having an opening extending longitudinally thereof, said opening being closed by opposite thin edged integral longitudinal flexible overlapping extensions of the respective edges of the opening, and an inner tube of expansible material adapted to be introduced and removed through said opening, said inner tube being provided with a valve stem projecting outwardly through the bag, for the purpose set forth.

2. As an article of manufacture, a core for the purpose described, comprising an outer bag having a longitudinal opening, the walls of said opening overlapping each other and each provided with a perforation, said perforations registering with each other, and one of them being enlarged circumferentially, and a rubber inner tube within the outer bag having a valve stem projecting through said openings.

3. As an article of manufacture, a pneumatic core for use in repairing tires comprising an outer flexible but substantially non-elastic curved bag having an opening extending longitudinally thereof on its concave side, each edge of said opening extending beyond the middle of the concave side of the bag so as to overlap each other, the ends of the outer overlapping edge being secured to the outer surface of the bag at opposite ends thereof, and an inner tube of elastic material adapted to be introduced and removed through said opening.

4. As an article of manufacture a core for the purpose described comprising an inner tube of readily elastic material, and an outer containing bag therefor having a longitudinal slit therethrough, the edges of said slit overlapping each other a material distance to form flaps, both of said flaps being connected together at their ends clear across the flap in a direction transverse to the slit, whereby said outer bag is expansible circumferentially for the purpose of introducing and removing the inner tube and permitting the outer bag to be expanded against the inner surfaces of the tire to be repaired but the inner flap cannot be forced out through the slit throughout its length.

In testimony whereof we have hereunto set our hands, in the presence of two subscribing witnesses.

ALVIN L. JOHNSON.
ALFRED O. ALSTEN.

Witnesses:
ALBERT E. FAY,
C. FORREST WESSON.